United States Patent
Chuah et al.

(10) Patent No.: US 7,023,884 B2
(45) Date of Patent: Apr. 4, 2006

(54) CLOCK OFFSET ESTIMATION WITH BIAS CORRECTION

(75) Inventors: Mooi Choo Chuah, Marlboro, NJ (US); Daniel R. Jeske, Eatontown, NJ (US); Muralidhran S. Kodialam, Marlboro, NJ (US); Ashwin Sampath, Somerset, NJ (US); Anlu Yan, Acton, MA (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1090 days.

(21) Appl. No.: 09/740,252

(22) Filed: Dec. 19, 2000

(65) Prior Publication Data

US 2002/0131370 A1 Sep. 19, 2002

(51) Int. Cl.
 *H04J 3/06* (2006.01)

(52) U.S. Cl. .................................. 370/507; 370/509
(58) Field of Classification Search ................ 370/503, 370/507, 508, 509, 511, 512, 516, 517, 519
See application file for complete search history.

(56) References Cited

U.S. PATENT DOCUMENTS

| | | | | |
|---|---|---|---|---|
| 4,142,069 A | * | 2/1979 | Stover | 370/507 |
| 5,907,685 A | * | 5/1999 | Douceur | 709/248 |
| 6,023,769 A | | 2/2000 | Gonzalez | |
| 6,587,875 B1 | * | 7/2003 | Ogus | 709/223 |
| 6,661,810 B1 | * | 12/2003 | Skelly et al. | 370/516 |
| 2002/0163932 A1 | * | 11/2002 | Fischer et al. | 370/465 |

OTHER PUBLICATIONS

D. L. Mills, "Improved Algorithms for Synchronizing Computer Network Clocks", IEEE/ACM Trans. on Networking, vol. 3, No. 3, Jun. 1995.
V. Paxson, "On Calibrating Measurements of Packet Transit Times", "Longer Version" from ftp://ftp.ee.lbl.gov/papers/vp–clocks–sigmetrics98ps.gz, Mar. 98.
V. Paxson, "On Calibrating Measurements of Packet Transit Times", "Shorter Version" from Proc. SIGMETRICS '98.

* cited by examiner

*Primary Examiner*—Ajit Patel
*Assistant Examiner*—Mark A. Mais

(57) ABSTRACT

A new algorithm for clock offset estimation for resources distributed across a network (such as the Internet). By exchanging a sequence of time-stamped messages between pairs of network nodes and separately estimating variable delays for each message direction, present inventive embodiments provide estimates for clock offset between node pairs and the bias of such estimates, thereby to permit more accurate correction. Present inventive algorithms operate in a variety of peer and server network configurations while providing significant improvement in convergence speed and accuracy.

17 Claims, 1 Drawing Sheet

CLOCK OFFSET ESTIMATION WITH BIAS CORRECTION

FIELD OF THE INVENTION

The present invention relates to synchronization of clocks. More specifically, the present invention relates to estimation and correction of clock offset in distributed resources interconnected by a network, such as the Internet.

BACKGROUND OF THE INVENTION

Accurate and reliable time information is necessary for many systems and applications involving distributed resources, including networked systems and processes typified by the Internet. In such systems, different functional elements are required to have their clocks synchronized. Clock synchronization involves two aspects: frequency synchronization and time synchronization. The former means that element clocks run at the same frequency, and the latter means that elements agree at a particular epoch with respect to the coordinated universal time (UTC), i.e., there is no offset between element clocks. For many purposes, it is appropriate to focus on estimating clock offset and to assume higher order effects, such as the frequency offset, can be ignored or provided for separately.

Clock synchronization issues have been extensively addressed in the literature. See, for example, D. Mills, Internet time synchronization: the Network Time Protocol, *IEEE Trans. Communications*, Vol. 39, No. 10, October 1991; D. Mitra, Network synchronization: analysis of a hybrid of master-slave and mutual synchronization, *IEEE Trans. Communications*, COM-28, 8 (August 1980), pp. 1245–1259; and N. W. Rickert, Non Byzantine clock synchronization—a programming experiment, *ACM Operating Systems Review* 22,1 (January 1988), pp. 73–78.

A well-known clock synchronization protocol that has been successfully deployed in the Internet is the Network Time Protocol (NTP), described, for example, in D. Mills, *Network Time Protocol (version 3) Specification, Implementation and Analysis RFC* 1305, March 1992. One of the most important network clock synchronization issues addressed by NTP is how to use the collected data to estimate the clock offset between a pair of network elements.

In V. Paxson, On Calibrating Measurements of Packet Transit Times, LBNL-41535, ftp://ftp.ee.lbl.gov/papers/vp-clocks-sigmetrics98.ps.gz, March, 1998 (and in a shortened paper with the same title published in *Proc. ACM Sigmetrics*98, June 22–26, 1998), the author proposed a new algorithm for clock offset estimation. For easy reference, this algorithm will be referred to as the Separate Direction Estimation Algorithm (SDEA). While SDEA can provide improved performance relative to the NTP algorithm, SDEA nevertheless suffers from significant limitations, especially in applying SDEA to contexts in which loading is different for each of the directional links between pairs of network elements.

SUMMARY OF THE INVENTION

Limitations of the prior art are overcome and a technical advance is made in accordance with the present invention, illustrative embodiments of which are presented in the following detailed description. In particular, limitations of the NTP algorithm and SDEA are overcome and SDEA techniques are extended and improved in accordance with present inventive teachings.

In addition to estimating the clock offset, present inventive techniques also estimate the bias of the estimation and attempt to correct any such bias. As a result, present inventive algorithms show significant improvement in terms of convergence speed and accuracy. Illustrative embodiments of present inventive algorithms will be referred to as Separate Direction Estimation Algorithms with Bias Correction (SDEABC).

In accordance with one aspect of present inventive methods, messages are exchanged (bi-directionally) between pairs of network elements, such messages including timestamps indicative of sending and receiving times noted at each stop. Because variable components of delay for each message direction need not be characterized by identical probability distribution functions, e.g., when links in each direction are differently loaded, undesired bias of estimates for clock offset can emerge. Illustrative embodiments of the present invention avoid errors in estimates of variable delay minimums by separately determining these minimums, e.g., by advantageously employing separate empirical probability distributions for each direction.

DETAILED DESCRIPTION

Separate Direction Estimation Algorithm

In network clock synchronization, each of a pair of network elements exchanges data packets (timing messages) with the other of the pair. One of such a pair is referred to as a sender, and the other as a receiver with respect to a particular packet. Based on time stamps contained in these timing messages, the clock offset between the sender and the receiver is estimated.

Figure 1:
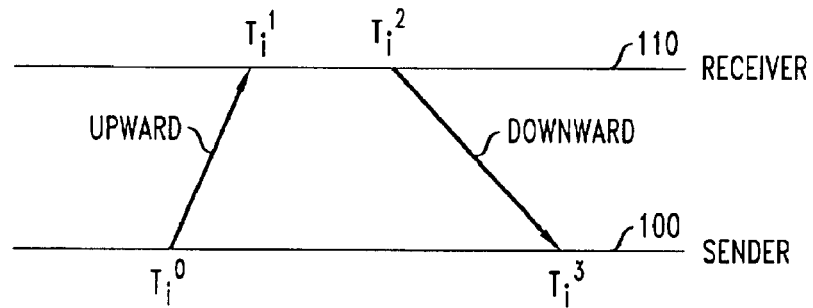
FIG. 1 illustrates time relations in sending messages between network elements.

More specifically, timing messages are sent between network elements as shown in FIG. 1, where activities at a sender 100 and a receiver 110 are shown for a particular round of message exchanges. At the i-th round of message exchange, the i-th message includes a time stamp $T_i^0$ indicating current time as known at the sender 100 when the message is sent to the receiver 110. Immediately upon reception of this message, receiver 110 puts a time stamp $T_i^1$ in the received message. The receiver then puts another time stamp $T_i^2$ on the message immediately before sending the message back to the sender. When sender 100 receives the message, it records the receiving time $T_i^3$. Using $T_i^0, T_i^1, T_i^2, T_i^3$, for i=1,2, . . . , the sender computes an estimate of the clock offset as between sender 100 and receiver 110.

Let $\theta$ be the receiver's clock offset from the sender. That is, if at a given instant the receiver's clock shows time $t_s$ and the sender's clock shows time $t_c$, then $\theta + e, dus\ \Delta t_s - t_c$. It proves convenient to denote the fixed delay from the sender to the receiver (called upward direction) by $d^u$ and the fixed delay from the receiver to the sender (called downward direction) by $d^d$. In this representation, the fixed delay includes all non-variable components of the delay such as transmission delay and propagation delay.

Let $e_i^u$ denote the variable component of the delay of the i-th message from the sender to the receiver and $e_i^d$ denote the variable component of delay from the receiver to the sender. The variable delay component is the part of the delay that would not occur under ideal conditions, and includes such delays as packet queuing delay and delay due to the unavailability of shared resources (e.g., CPU or bandwidth).

We then have the following equations $$T_i^1 - T_i^0 = d^u + \theta + e_i^u \quad (1)$$

$$T_i^3 - T_i^2 = d^d - \theta + e_i^d \quad (2)$$

For ease of further description of present inventive algorithms, it proves convenient to define $X_i$, e,dus $\Delta T_i^1 - T_i^0$ and $Y_i$, e,dus $\Delta T_i^3 - T_i^2$, where $i = 1, \ldots, n$ after the exchange of n messages.

The above-cited SDEA keeps the smallest values of $X_i$ and $Y_i$, viz., it keeps variables $$U_n \triangleq \min_{i=1,\ldots,n} \{X_i\}, \text{ and } V_n \triangleq \min_{i=1,\ldots,n} \{Y_i\}.$$

The estimate for $\theta$ using n samples is then computed as $$\hat{\theta}_n = (U_n - V_n)/2. \quad (3)$$

Separate Direction Estimation Algorithm with Bias Correction (SDEABC)

From (3), with $E[\cdot]$ as the expected value operator we can see that, assuming $d^u = d^d$, $$E[\hat{\theta}_n] = E[U_n - V_n]/2 \quad (4)$$

$$= \theta + \left( E\left[\min_{i=1,\ldots,n}\{e_i^u\}\right] - E\left[\min_{i=1,\ldots,n}\{e_i^d\}\right] \right)/2.$$

Therefore, the SDEA is asymptotically unbiased if the pdf of both $e_i^u \geq 0$ and $e_i^d \geq 0$ is positive near 0. However, with a finite number of samples, the estimator is biased if $$E\left[\min_{i=1,\ldots,n}\{e_i^u\}\right] \neq E\left[\min_{i=1,\ldots,n}\{e_i^d\}\right],$$

a not unlikely event because of differences between uplink and downlink traffic loading. As will be seen, illustrative embodiments of the present invention reduce such errors in estimates due to bias.

The empirical distribution of a random variable $R \geq 0$ is illustratively constructed in a manner now to be described. Suppose R is independently sampled n times with the result being $r_1, \ldots, r_n$. We rearrange the n samples so that $r_{1:n} < r_{2:n} \leq \ldots \leq r_{n:n}$, where each $r_{i:n}$ is from the original sample set. Further, let $r_{0:n} = 0$ and $r_{n+1:n} = \infty$. The empirical distribution of R is then $$F_n(x) = \sum_{i=1}^{n+1} \left( \frac{i-1}{n} \right) I(r_{i-1:n} \leq x < r_{i:n}), \quad (5)$$

where $I(\cdot)$ is an indicator function, i.e., $I(\cdot) = 1$ when the argument of I is satisfied, and is 0 otherwise. Equivalently, the complementary distribution function is $$\bar{F}_n(x) = \sum_{i=1}^{n+1} \left( \frac{n-i+1}{n} \right) I(r_{i-1:n} \leq x < r_{i:n}). \quad (6)$$

Note that since the intervals $[r_{i-1:n}, r_{i:n})$ are non-overlapping, $$(1 - F_n(x))^n = \sum_{i=1}^{n+1} \left( \frac{n-i+1}{n} \right)^n I(r_{i-1:n} \leq x < r_{i:n}) \quad (7)$$

Suppose that independent, identically distributed (i.i.d.) random variables $R_i$, $i = 1, 2, \ldots, n$ have a distribution function $F(x)$. Then, $\min_{i=1}^n \{R_i\}$ has the complementary distribution functions $(1 - F(x))^n$. Define $$\gamma_n^R \triangleq E[\min_{i=1}^n \{R_i\}],$$

By using the empirical distribution function $F_n(x)$ to replace $F(x)$, an estimate of $$\gamma_n^R, \hat{\gamma}_n^R,$$

is obtained as $$\hat{\gamma}_n^R = \int_0^\infty (1 - F_n(x))^n \, dx \quad (8)$$

$$\hat{\gamma}_n^R = \sum_{i=1}^{n+1} \left( \frac{n-i+1}{n} \right)^n * (r_{i:n} - r_{i-1:n}).$$

As shown in (4), the bias of the SDEA estimator is $$b_n \triangleq E[\hat{\theta}_n] - \theta,$$

and an estimate of this bias, $\hat{b}_n$, is given by $$\hat{b}_n = ((\hat{\gamma}_n^X - \hat{\gamma}_n^Y)/2) - \hat{\theta}_n. \quad (9)$$

Based on the foregoing, it can readily be seen that a more accurate determination can be made of clock offset by correcting for bias of estimates made using SDEA. That is, by determining analytically what the bias in an estimate using SDEA is in a particular environment, correcting by an amount equal to the bias achieves a more accurate estimate of clock offset. This more accurately estimated correction is then advantageously applied to the out-of-synchronization clock. Moreover, the expected value of the bias provides a monitor for the analytical process; variations of this expected value over time can signal conditions in a network that may indicate greater or lesser confidence in clock offset estimates.

In accordance with an approach that is preferred for some applications, a method again proceeds from evaluation of $\hat{\theta}_n = (U_n - V_n)/2$, as in Eq. (3). Since $$U_n \triangleq \min_{i=1,\ldots,n} \{X_i\}, \text{ and } V_n \triangleq \min_{i=1,\ldots,n} \{Y_i\},$$

forming the expected value of each side of Eq. (3) and employing the notation from Eq. (8) for each of random variables $U_n$ and $V_n$ yields $$E[\hat{\theta}_n] = E[(U_n - V_n)]/2 \qquad (10)$$
$$= \left[\frac{E[U_n]}{2}\right] - \left[\frac{E[V_n]}{2}\right]$$
$$= \left[\frac{\gamma_n^X}{2}\right] - \left[\frac{\gamma_n^Y}{2}\right] = \frac{1}{2}(\gamma_n^X - \gamma_n^Y)$$

We may take $$b_n \stackrel{\Delta}{=} E[\hat{\theta}_n] - \theta,$$

but in forming an estimate of $b_n$, the bias in the estimate of $\theta$ after n samples, we employ $$\hat{b}_n = \frac{1}{2}(\hat{\gamma}_n^X - \hat{\gamma}_n^Y) - \frac{1}{2}(\min\{X_i\} - \min\{Y_i\}).$$

Then, in accordance with the present approach, a bias-corrected (BC) estimate (SDEABC) for $\theta$ is given by $$\hat{\theta}_n^{BC} = \hat{\theta}_n - \hat{b}_n$$
$$= (\min\{X_i\} - \min\{Y_i\}) - \frac{1}{2}(\hat{\gamma}_n^X - \hat{\gamma}_n^Y).$$

Figure 2:
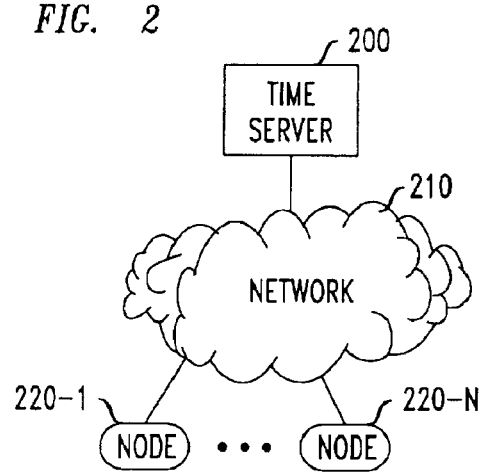
FIG. 2 shows an illustrative network embodiment of the present invention having a single server node for interacting with a plurality of other nodes to effect clock correction at such other nodes.

FIG. 2 shows an illustrative single-server network deployment of present inventive techniques. Specifically, FIG. 2 shows a time server 200 connected through a network 210 to a plurality of other network nodes 220-i, i=1, 2, . . . , N. Nodes 220-i may be routers, switches, servers of various kinds, network end points (including terminals, workstations or computers), or any other kind of network node. Each of nodes 220-i has a clock and messaging facilities for exchanging messages with time server 200 in the manner described above. That is, time server 200 forms one of the pair of nodes and, in turn, one or more (typically all) of the nodes 220-i forms the other of the node pair for purposes of exchanging time-stamped messages and deriving offset estimates and estimate bias information. While each of the nodes 220-i may have equal access to time server 200, priorities may be accorded some nodes 220-i, or some nodes 220-i may be accorded access to server 200 more frequently.

By exchanging messages with nodes 220-i, time server 200 will provide clock offset estimates and estimate bias information as described above, which information is available at nodes 220-i for correcting clock offset. Of course, N may have a value of 1, so that only a single network node device may interact with a particular time server. While time server 200 is shown as a separate dedicated function network node, it will be understood that the function of network node 200 may be included in a node performing other functions. Likewise, many network arrangements will have a plurality of time servers, each serving network nodes connected on a respective network or sub-network 210.

Figure 3:
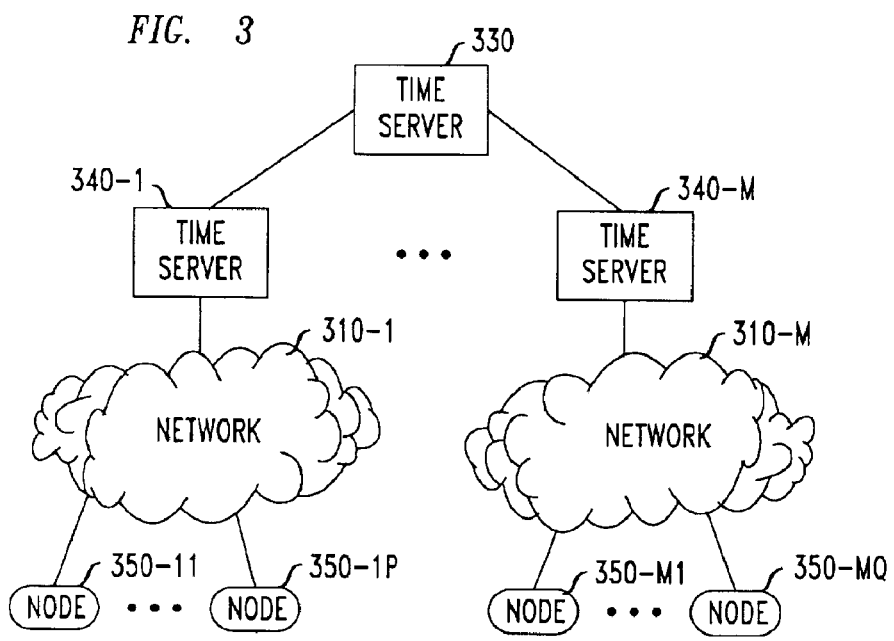
FIG. 3 shows an illustrative network embodiment of the present invention having a hierarchy of server nodes with lowest order server nodes for interacting with other network nodes to effect clock correction at such other nodes.

FIG. 3 shows an illustrative alternative network arrangement in which a plurality of time servers 330 and 340-i, i=1, 2, . . . , M, are connected in hierarchical relation through a plurality of networks 310-i, i =1, 2, . . . , M. In the illustrative arrangement of FIG. 3, only two levels are shown in the server hierarchy, but those skilled in the art will recognize that any number of levels of time servers may be used. Likewise, while the number of networks is shown equal to the number of nodes at the lowest hierarchical level, no such limitation is required in practicing the present invention using a hierarchical arrangement of time servers. Each of the networks 310-i has one or more network nodes capable of accessing the respective time server connected to the network. By way of illustration, network 310-1 has nodes 350-11 through 350-1P connected to it. Likewise, network 310-M is shown having nodes 350-M1 through 350-MQ. Here, P and Q may be any integer.

In operation, time server 330 exchanges time-stamped messages with each of the time servers 340-i to provide the latter with offset estimates and estimate bias information of the type illustrated above to permit clock correction at the illustrative (second-level) time servers 340-i. Each of the time servers 340-i then serves the clock correction requirements of respective nodes 350-xx in the same manner. Of course, when more than two hierarchical levels of time servers are used, each level (after the first or highest) derives clock synchronization information from a time server at the next highest level. The number of nodes will generally vary from one network 310-i to another, and all or some of networks 310-i may be sub-networks of a larger network. Some time servers may be connected to nodes such as 350-xx and to a next lower order node as well. Some or all time servers may be located in the same local area or distributed over a wide area (including globally) to meet load and geographic distribution requirements for clock synchronization service.

Access to respective time servers by particular nodes (or subordinate time servers) may be scheduled (e.g., periodic), dependent upon availability of time server resources, dependent on prior clock offset behavior at particular nodes (or subsidiary time servers) or detected conditions at such nodes or subsidiary time servers. Exchange of messages and derivation of correction information in accordance with present inventive teachings may be initiated, in appropriate cases, by a particular time server or by a node (or subsidiary time server) for which the particular time server provides clock synchronization services. In each case, however, the time server acts as the reference source of time in determining offset using exchanges of time-stamped messages of the types described above. Thus, for example, a particular node (routinely, or in response to conditions detected at that node) may request that an associated time server initiate a synchronization sequence and supply the results to the particular node. Numerous and varied particular applications of the present inventive principles, all within
the spirit of the present description and scope of the attached claims, will prove useful to those skilled in the art.

What is claimed is:

1. In a network having a plurality of network nodes, each node having a clock, a method for determining information at a first network node for adjusting a clock at a selected second network node, the method comprising determining an estimate of the offset of said clock at said second node relative to the clock at said first node, and determining an estimate of bias of said estimate of said clock offset, said determining an estimate of the offset and said determining an estimate of bias comprising exchanging a plurality of rounds of ordered time-stamped messages between said first node and said second node.

2. The method of claim 1 wherein at the ith of said rounds, i=1, . . . , N, where N is an integer, said messages comprise from said first node, a first message to said second node comrising a time stamp $T_i^0$ indicating the current time at said first node when sid first message is sent, from said second node, a second message to said first node comprising a time stamp $T_i^1$ indicating the current time at said second node when said first message was received, and a time stamp $T_i^2$ indicating the time at said second node at which said second message is sent.

3. The method of claim 2 further comprising determining $T_i^3$, the time at which said second message is received at said first node.

4. The method of claim 3 further comprising determining at said first node for each i, i=1, 2, ..., n $$X_i \triangleq T_i^1 - T_{1ihu\ 0} \text{ and } Y_i \triangleq T_i^3 - T_i^2,$$

where $$T_i^3 - T_i^2 = d^d - \theta + e_i^d$$

$$T_i^1 - T_i^0 = d^u + \theta + e_i^u, \text{ and}$$

where $\theta$ is the offset of the clock at said second node from the clock at said first node, $d^u$ is the fixed delay experienced by a message from said first station to said second station, $d^d$ is the fixed delay experienced by a message from said second station to said first station, with $d^u$ and $d^d$ being equal or individually known, $e_i^u$ is the variable delay at said ith round for a message from said first station to said second station, $e_i^d$ is the variable delay at said ith round for a message from said second station to said first station.

5. The method of claim 4 further comprising determining an estimate, $\hat{\theta}_n$, of $\theta$ based on $X_i$ and $Y_i$ after n message exchanges between said first node and said second node.

6. The method of claim 5 wherein $\hat{\theta}_n = (U_n - V_n)/2$, where $$U_n \triangleq \min_{i=1,\ldots,n} \{X_i\},$$

and $$V_n \triangleq \min_{i=1,\ldots,n} \{Y_i\}.$$

7. The method of claim 6 wherein said estimate of bias of said estimate of clock offset, is determined based on separate determinations of $$E\left[\min_{i=1,\ldots,n} \{X_i\}\right]$$

and $$E\left[\min_{i=1,\ldots,n} \{Y_i\}\right].$$

8. The method of claim 7 wherein said bias of said estimate of clock offset, is determined as $$b_n \triangleq E[\hat{\theta}_n] - \theta.$$

9. The method of claim 8 wherein $$b_n = \left(\left(E\left[\min_{i=1,\ldots,n}\{X_i\}\right] - E\left[\min_{i=1,\ldots,n}\{Y_i\}\right]\right)\bigg/2\right) - \theta.$$

10. The method of claim 8 wherein said estimate of bias of said estimate of clock offset, is determined as $$\hat{b}_n = \frac{1}{2}(\hat{\gamma}_n^X - \hat{\gamma}_n^Y) - \frac{1}{2}(\min\{X_i\} - \min\{Y_i\}), \text{ where}$$

$$\gamma_n^X = E\left[\min_{i=1,\ldots,n}\{X_i\}\right] \text{ and } \gamma_n^Y = E\left[\min_{i=1,\ldots,n}\{Y_i\}\right].$$

11. The method of claim 10 wherein a bias-corrected estimate for $\theta$ is given by $$(\min\{X_i\} - \min\{Y_i\}) - \frac{1}{2}(\hat{\gamma}_n^X - \hat{\gamma}_n^y).$$

12. In a network having a plurality of network nodes, each node having a clock, a method for adjusting a clock at a selected second node to be more nearly in synchronism with a clock at a first node, the method comprising determining an estimate of the offset of said clock at said second node relative to the clock at said first node, determining an estimate of bias of said estimate of said clock offset, and sending said estimate of said offset and said estimate of said bias to said second node to effect said adjustment of said clock at said second node, said determining an estimate of the offset and said determining an estimate of bias comprising exchanging a plurality of rounds of ordered time-stamped messages between said first node and said second node.

13. The method of claim 12 wherein said first node is a time-server node providing estimates of offset of said clock and estimates of bias of said estimates of offset of said clock for each of a plurality of second nodes.

14. The method of claim 13 wherein at least some of said second nodes are time-server nodes serving respective pluralities of said second nodes.

15. The method of claim 13 wherein said exchanging of a plurality of rounds of messages is initiated for each of a plurality of second nodes by said first node.

16. The method of claim 13 wherein said exchanging of a plurality of rounds of messages for at least some second nodes is initiated by respective ones of said second nodes.

17. The method of claim 16 wherein said at least some second nodes initiate said messages by sending a message to said first node to send a first of said time-stamped messages.

\* \* \* \* \*